(12) United States Patent
Motoyama et al.

(10) Patent No.: US 7,135,246 B2
(45) Date of Patent: Nov. 14, 2006

(54) ELECTRONIC APPARATUS HAVING ENERGY-SAVING COOLING SYSTEM

(75) Inventors: Hideyuki Motoyama, Kawasaki (JP); Hideki Tanaka, Kawasaki (JP); Hiroshi Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 490 days.

(21) Appl. No.: 10/623,530

(22) Filed: Jul. 22, 2003

(65) Prior Publication Data

US 2004/0182540 A1  Sep. 23, 2004

(30) Foreign Application Priority Data

Jul. 29, 2002  (JP) .............................. 2002-219857

(51) Int. Cl.
*H01M 8/04* (2006.01)
*H01M 10/50* (2006.01)
*F28D 21/00* (2006.01)
*F04B 45/06* (2006.01)

(52) U.S. Cl. ..................... 429/26; 429/120; 165/80.4; 417/229; 417/478

(58) Field of Classification Search ............... 429/26, 429/34, 120; 165/46, 80.4; 417/229, 472, 417/478
See application file for complete search history.

(56) References Cited

U.S. PATENT DOCUMENTS

| 3,536,423 | A | * | 10/1970 | Robinson ................ 417/394 |
| 3,780,760 | A | * | 12/1973 | Berner ................... 137/516.25 |
| 5,587,880 | A | * | 12/1996 | Phillips et al. .............. 361/687 |
| 5,720,338 | A | * | 2/1998 | Larson et al. ................. 165/46 |
| 6,326,097 | B1 | * | 12/2001 | Hockaday ................. 429/26 X |
| 6,352,455 | B1 | * | 3/2002 | Guagliano et al. ...... 417/478 X |
| 6,474,823 | B1 | * | 11/2002 | Agata et al. ................... 362/26 |
| 6,519,147 | B1 | * | 2/2003 | Nakagawa et al. .... 165/80.4 X |
| 6,611,425 | B1 | * | 8/2003 | Ohashi et al. .............. 361/687 |

FOREIGN PATENT DOCUMENTS

JP         7-243738         9/1995

* cited by examiner

*Primary Examiner*—Stephen J. Kalafut
(74) *Attorney, Agent, or Firm*—Westerman, Hattori, Daniels & Adrian, LLP.

(57) ABSTRACT

An electronic apparatus includes a component to which a pressure is applied or which provides vibration, a heat absorbing member, a heat dissipating member, an elastomer bag which receives a pressure or the vibration from the component, a first check valve connected to a port of the elastomer bag, a second check valve connected to another port of the elastomer bag, and a coolant which flows passing through the heat absorbing member, the first check valve, the elastomer bag, the second check valve, and said heat dissipating member.

24 Claims, 9 Drawing Sheets

ELECTRONIC APPARATUS HAVING ENERGY-SAVING COOLING SYSTEM

FIELD OF THE INVENTION

The present invention relates to cooling of an electronic apparatus, and more particularly to an energy-saving cooling system for use in a small electronic device such as a notebook personal computer (PC).

BACKGROUND OF THE INVENTION

With the recent increasing processing rates of notebook PCs, the amount of heat diffused from their heat producing components, such as CPUs, hard disk drives, and graphics chips has been increasing. Such heat producing components, however, cannot be sufficiently cooled by conventional components, such as a heat sink, a heat pipe, and a cooling fan.

Conventionally, it is known that a notebook PC employs a closed loop system constructed of a tube that efficiently cools the CPU by circulating a liquid coolant in the tube from a heat absorbing element to a heat dissipating element and back to the heat absorbing element by means of an electric motor.

In Japanese Patent Application Laid-Open Publication (JP-A) HEI 7-243738 published on Sep. 19, 1995, Takeda et al. disclose an electronic apparatus cooling device using a magnetic fluid vibration motor. In this cooling device, a tube forms a closed loop, and a spherical magnetic member is caused to vibrate along the tube by means of an external magnetic field formed by an exciting current flowing through a coil in a driving section of the tube, to cause the liquid coolant in the tube to flow back and forth between the heat absorbing element and the heat dissipating element, whereby efficient cooling is achieved. The spherical magnetic element has an outer diameter which is substantially equal to an inner diameter of the tube. In an alternative configuration, the cooling device includes a tube of a closed loop having a branch tube equipped with such a driving section, and a one-way valve is provided on each side or one side of the branching section of the closed loop tube, wherein the liquid coolant is circulated by causing the spherical magnetic element to vibrate along the branch tube.

Forced cooling in common electronic apparatuses requires electric energy. In a battery operated electronic apparatus, however, it is desirable to reduce electric energy consumption significantly.

The inventors have recognized the need for an efficient energy-saving cooling system for an electronic apparatus.

An object of the present invention is to provide energy-saving cooling in an electronic apparatus.

Another object of the invention is to provide cooling in an electronic apparatus by circulating a fluid coolant by means of an energy-saving driving power.

SUMMARY OF THE INVENTION

In accordance with an aspect of the present invention, an electronic apparatus includes a component to which a pressure is applied or which provides vibration, a heat absorbing member, a heat dissipating member, an elastomer bag which receives a pressure or the vibration from the component, a first check valve connected to a port of the elastomer bag, a second check valve connected to another port of the elastomer bag, and a coolant which flows passing through the heat absorbing member, the first check valve, the elastomer bag, the second check valve, and said heat dissipating member.

The elastomer bag is placed in close proximity to the component. The elastomer bag in combination with the first and second check valves operates in such a manner as to pump the coolant, in response to the application and releasing of the pressure from the component or to the vibration therefrom.

The electronic apparatus further includes an accumulator tank for storing said coolant, and the tank may be connected to the heat dissipating member. The accumulator tank may contain therein a closed or sealed air bag.

The electronic apparatus may further include a second elastomer bag, which is connected to third and fourth check valve, and which receives a pressure or vibration from a second component.

According to the invention, in an electronic apparatus, energy-saving cooling can be provided and a fluid coolant can be circulated by means of an energy-saving driving power.

Throughout the drawings, similar symbols and numerals indicate similar items and functions.

DESCRIPTION OF THE PREFERRED EMBODIMENTS

Figure 1:
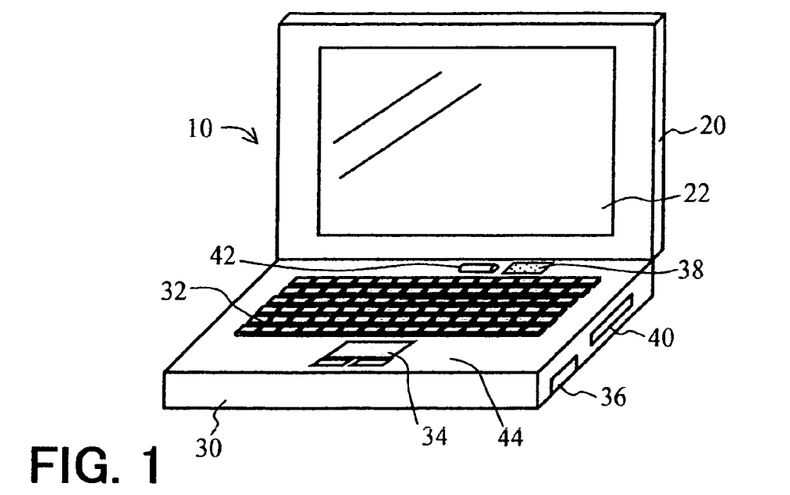
FIG. 1 shows an electronic apparatus, such as a notebook personal computer or a PDA, to which the present invention is applicable.

FIG. 1 shows an electronic apparatus 10, such as a notebook personal computer (PC) or a PDA (Personal Digital Assistant), to which the present invention is applicable. The electronic apparatus 10 includes a display housing 20 and a main unit housing 30. A display 22, such as a liquid crystal display (LCD), is fixed in the display housing 20. The main unit housing 30 accommodates a keyboard 32, a pointing device 34, a rechargeable battery 36, a speaker 38, a CD/DVD drive 40, a jog dial 42, a cooling fan, a processor, a hard disk drive and the like, which are fixed in the main unit housing 30. A palm rest 44 for supporting user's hands placed on the left and right sides of the pointing device 34 is provided on the upper surface of the main unit housing 30.

Figure 2:
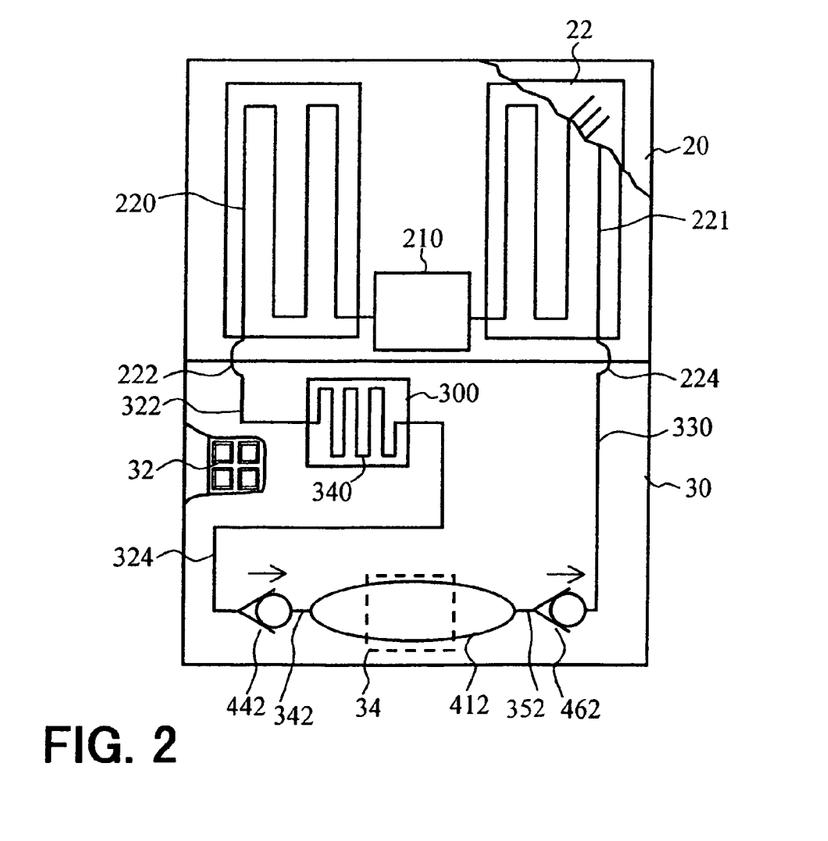
FIG. 2 shows a partially cutaway top plan view illustrating a display housing and a main unit housing, in accordance with an embodiment of the present invention, when the display housing is opened so that the display surface of the display housing makes an angle of 180 degrees with the manual operation surface of the main unit housing in the electronic apparatus of FIG. 1.

FIG. 2 is a partially cutaway top plan view illustrating the display housing 20 and the main unit housing 30, in accordance with an embodiment of the present invention, when the display housing 20 is opened so that the display surface of the display housing 20 makes an angle of 180 degrees with the manual operation surface of the main unit housing 30 in the electronic apparatus 10 of FIG. 1. The display housing 20 contains therein heat dissipating members 220 and 221, which are placed behind the display 22, and through which a liquid coolant circulates to dissipate heat from the rear panel of the display housing 20, and also an accumulator tank 210, which is connected between the dissipating members 220 and 221 and used to store the liquid coolant. The tank 210 has a watertight construction to prevent the liquid coolant from leaking out through any portion other than its inlet and outlet ports. The liquid coolant may be an antifreeze liquid for example. The heat dissipating members 220 and 221 may be bent aluminum tubes for example. The tubes are arranged in such a manner as to contact the rear panel of the display housing 20.

In FIG. 2, the main unit housing 30 contains therein: a heat absorbing member 340 which is placed in close proximity to a heat generating portion 300, which may be the CPU, hard disk drive, graphics chip and/or the like, in the electronic apparatus 10; check valves 442 and 462 which allow the liquid coolant to flow in only one direction and thus prevent it from flowing backward; and an elastomer bag or tube 412 which is connected between the check valves 442 and 462. The heat absorbing member 340, the check valves 442 and 462 and the elastomer bag 412 are located behind the manual operation surface on the side of the keyboard 32. In the figure, the check valves 442 and 462 are represented by symbols conforming to the JIS (Japanese Industrial Standard). In FIG. 2, the elastomer bag 412 is located behind the pointing device 34 and the palm rest 44. The pointing device 34 moves and vibrates vertically when clicked or pressed by a finger. The palm rest 44 slightly moves downward vertically when hands are placed thereon.

The heat absorbing member 340 may be a bent aluminum tube for example. Preferably, the tube is arranged in such a manner as to contact the heat generating portion 300.

The bottom left outlet port of the heat dissipating member 220 is connected to the inlet port of the heat absorbing member 340 via a rubber tube 222 running between the two housings or cases 20 and 30 and via a tube 322. The outlet port of the heat absorbing member 340 is connected to the inlet port of the check valve 442 via a tube 324. The outlet port of the check valve 442 is connected to the inlet port of the elastomer bag 412 via a tube 342. The outlet port of the elastomer bag 412 is connected to the inlet port of the check valve 462 via a tube 352. The outlet port of the check valve 462 is connected to the bottom right inlet port of the heat dissipating member 221 via a tube 330 and a rubber tube 224. The rubber tubes 222 and 224 are used and adapted to provide the fluid flow path regardless of the angle between the display housing 20 and the main unit housing 30. The closed loop fluid circuit is thus formed. The tubes 322, 324, 342, 352, and 330 each may be formed of a plastic or metal tube, the outer diameter of which is about 1 to 3 mm, and the cross section of which may be elliptical in shape for example.

In operation, when the user operates the pointing device 34 with his or her hands placed on the palm rest 44, the elastomer bag 412, in response to the repetitive pressing and vibration associated with the operation, compresses and expands in a repetitive manner and thus pumps the liquid coolant contained therein. With the elastomer bag 412 repetitively compressing, the liquid coolant contained therein is pumped through the check valve 462 and gradually flows into the heat dissipating member 221 where the heat is dissipated. After that, the liquid coolant flows into the accumulator tank 210. With the elastomer bag 412 repetitively expanding, the liquid coolant in the tank 210 flows out and is cooled through the heat dissipating member 220, and flows into the heat absorbing member 340 where the liquid coolant absorbs heat from the heat generating portion 300. After that, the liquid coolant is passed through the check valve 442 and gradually flows back into the elastomer bag 412. In this way, the liquid coolant circulates between the heat absorbing member 340 and the heat dissipating members 220 and 221 and cools the heat generating portion 300 without consuming energy or power from the AC power supply or the DC battery 36 of the electronic apparatus 10.

Figure 3A:
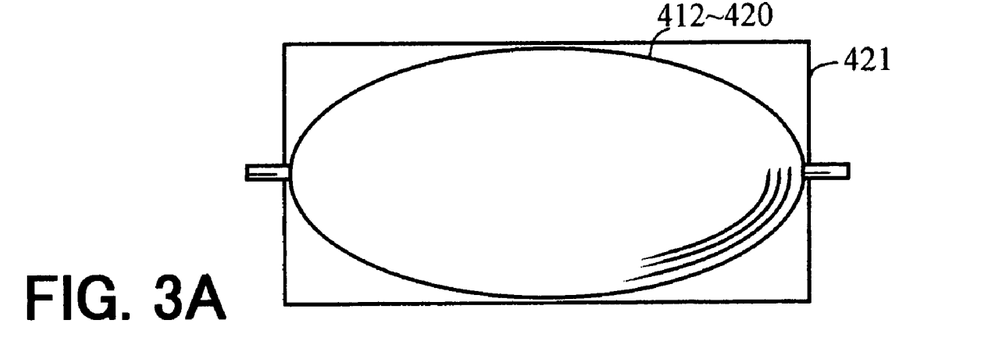
FIGS. 3A and 3B show a top plan view and a front side view of the elastomer bag or tube, respectively.
Figure 3B:
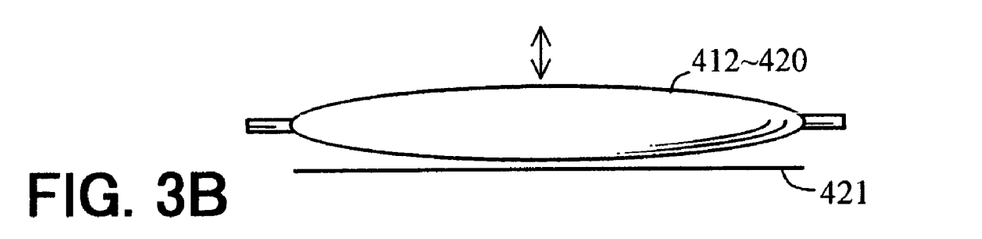

FIG. 3A shows a top plan view of the elastomer bag or tube 412–420, described above in connection with FIG. 2 and described later in connection with FIGS. 8 to 12. FIG. 3B shows a front side view of the elastomer bag 412–420. The elastomer bag 412 is made of a rubber or soft plastic material, and is substantially ellipsoidal in shape with its center portion bulging. The elastomer bag 412 is placed facing the pressure or vibration source so that the substantially flat surface of the center portion receives the pressure and vibration, the opposite surface thereof being supported on a support plate 421. For simplicity of illustration, the support plate 421 is not shown in FIG. 2.

Figure 4A:
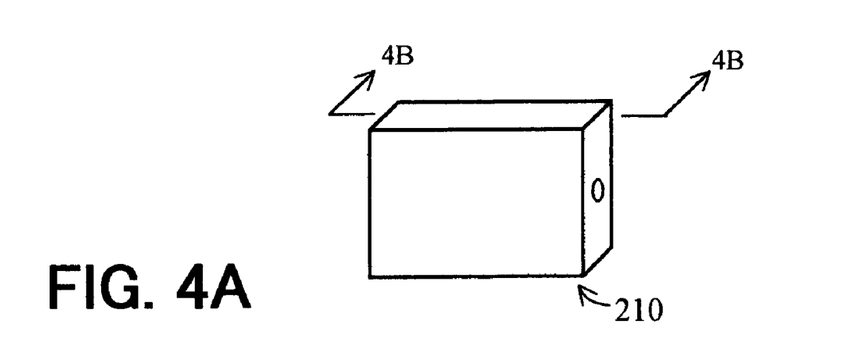
FIG. 4A shows a perspective view of the accumulator tank of FIG. 2.
Figure 4B:
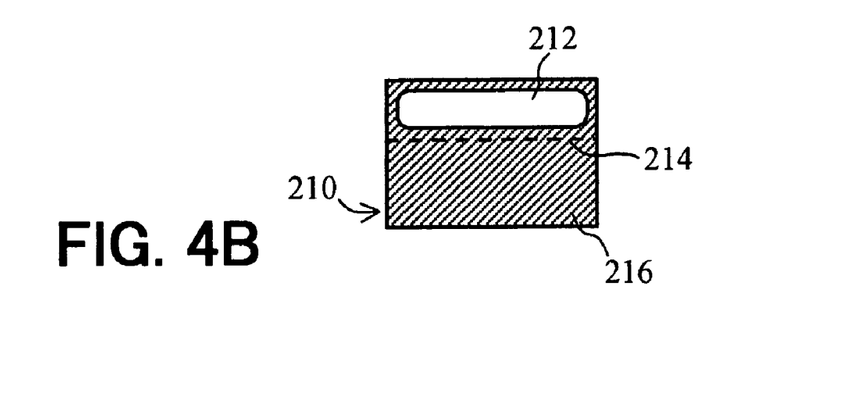
FIG. 4B shows a vertical cross sectional view of the accumulator tank taken along line 4B—4B in FIG. 4A.

FIG. 4A shows a perspective view of the accumulator tank 210 of FIG. 2. FIG. 4B shows a vertical cross sectional view of the accumulator tank 210 taken along the line 4B—4B in FIG. 4A. The accumulator tank 210 contains a rubber or plastic air bag 212 which is expandable and compressible like a rubber balloon. The air bag 212 is located in the upper part of the accumulator tank 210, and its movement is limited by a grid 214 so that it will not close the inlet and outlet ports for the liquid coolant 216, regardless of where and how the electronic apparatus 10 is placed. Alternatively, such an air bag may be placed in the lower part of the tank 210. When the elastomer bag 412 is compressed, causing the liquid coolant 216 to flow into the tank 210 and thus increasing the amount of fluid stored therein, the air bag 212 compresses. Conversely, when the elastomer bag 412 expands, causing the liquid coolant 216 to flow out of the tank 210 and thus reducing the amount of fluid stored therein, the air bag 212 expands. In other words, the elastomer bag 412 compresses and expands in conjunction with the elastic force of the air bag 212.

Figure 5A:
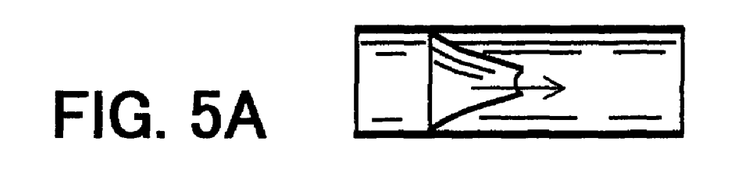
FIGS. 5A and 5B show the structure and operation of a known check valve.
Figure 5B:
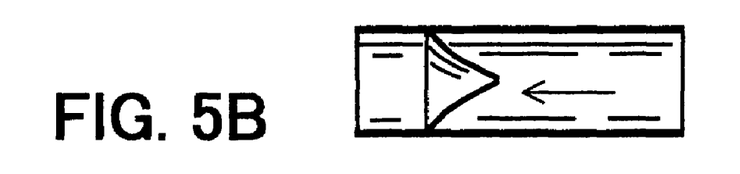

FIGS. 5A and 5B show the structure and operation of a known check valve that can be used as the check valves 442 and 462. The check valve shown in FIGS. 5A and 5B has a substantially cone-shaped diaphragm protruding axially in the rightward direction. As shown in FIG. 5A, the check valve allows the liquid coolant to flow only in the rightward direction in which the diaphragm protrudes. However, as shown in FIG. 5B, the check valve prevents the liquid coolant from flowing backward in the direction opposite to the direction in which the diaphragm protrudes.

Figure 6A:
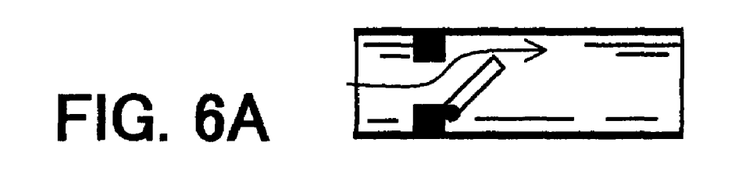
FIGS. 6A and 6B show the structure and operation of another known check valve.
Figure 6B:
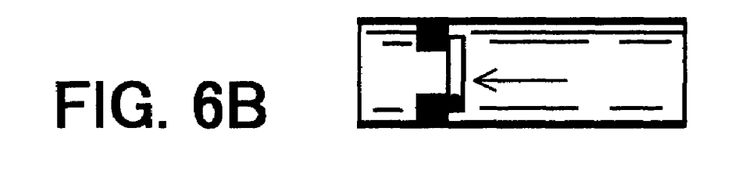

FIGS. 6A and 6B show the structure and operation of another known check valve that can be used as the check valves 442 and 462. The check valve shown in FIGS. 6A and 6B has a hinged thin plate or diaphragm mounted substantially perpendicular to the axis of the tube and configured to open only in the rightward direction. As shown in FIG. 6A, the check valve allows the liquid coolant to flow only in the rightward direction in which the thin plate opens. However, as shown in FIG. 6B, the check valve prevents the liquid coolant from flowing backward in the direction in which the thin plate closes.

Figure 7A:
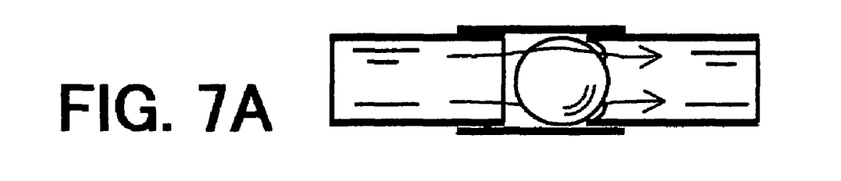
FIGS. 7A and 7B show the structure and operation of a further known check valve.
Figure 7B:
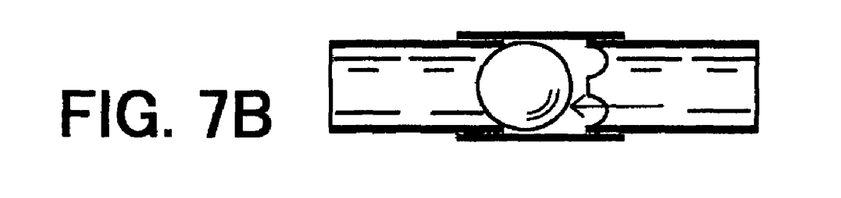

FIGS. 7A and 7B show the structure and operation of a further known check valve that can be used as the check valves 442 and 462. The check valve shown in FIGS. 7A and 7B includes a spherical member or ball entrapped in a space between left- and right-side tubes. The left-side tube has a circular end that is cut flat, while the right-side tube has a notched circular end. As shown in FIG. 7A, the check valve allows the liquid coolant to flow only in the rightward direction, in which the ball is brought into contact with the notched end. However, as shown in FIG. 7B, the check valve prevents the liquid coolant from flowing backward in the direction, in which the ball is brought into contact with the circular end.

Figure 8:
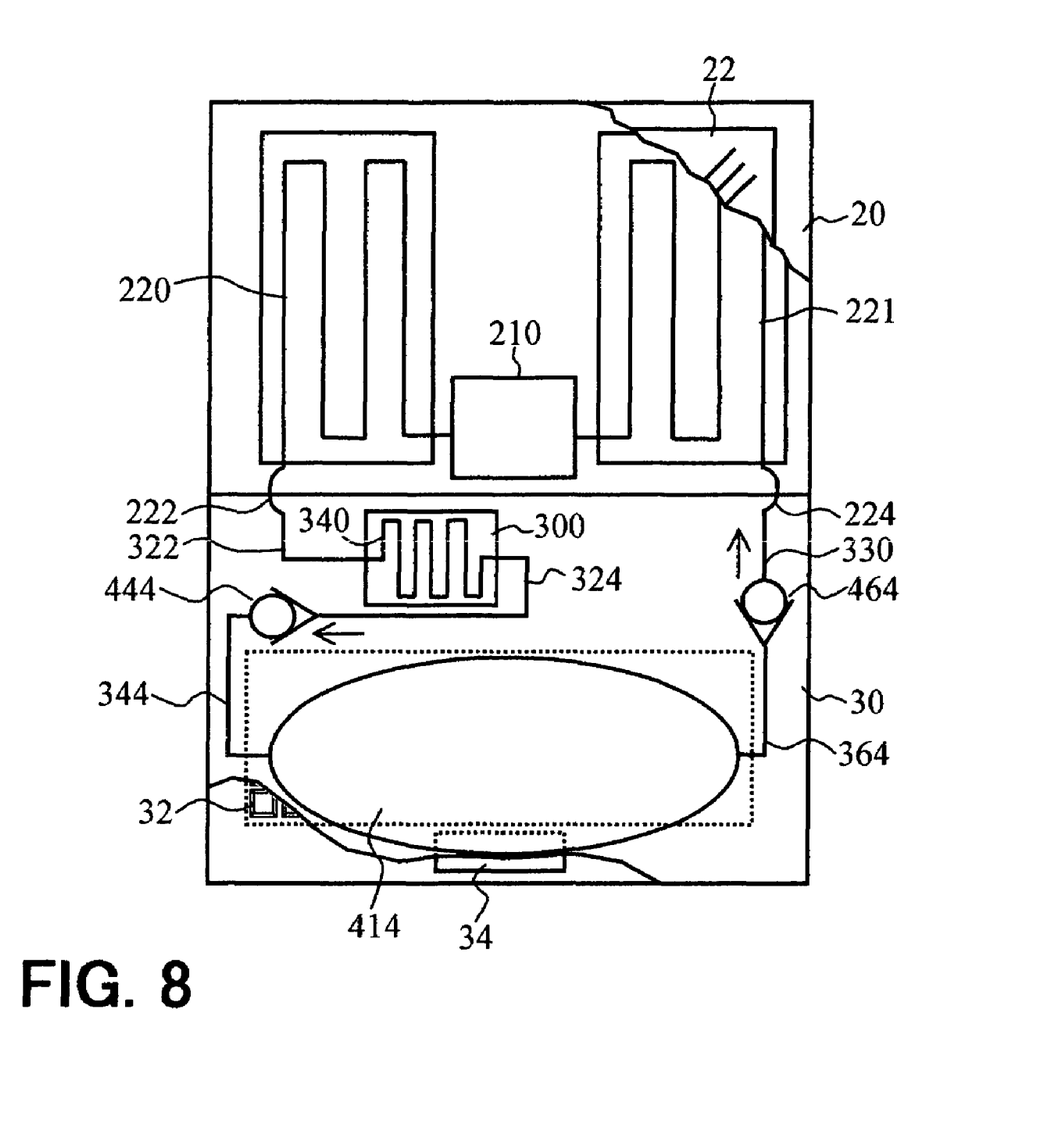
FIG. 8 shows a partially cutaway top plan view illustrating the display housing and the main unit housing, in accordance with another embodiment of the invention, when the display housing is opened so that the display surface of the display housing makes an angle of 180 degrees with the manual operation surface of the main unit housing in the electronic apparatus of FIG. 1.

FIG. 8 shows a partially cutaway top plan view illustrating the display housing 20 and the main unit housing 30, in accordance with another embodiment of the invention, when the display housing 20 is opened so that the display surface of the display housing 20 makes an angle of 180 degrees with the manual operation surface of the main unit housing 30 in the electronic apparatus 10 of FIG. 1. The display housing 20 has a construction similar to that shown in FIG. 2, and hence will not be described again.

In FIG. 8, the main unit housing 30 contains therein: a heat absorbing member 340 which is placed in close proximity to the heat generating portion 300; check valves 444 and 464 which allow the liquid coolant to flow in only one direction; and an elastomer bag 414 which is connected between the check valves 444 and 464. The heat absorbing member 340, the check valves 444 and 464, and the elastomer bag 414 are located behind the manual operation surface on the side of the keyboard 32. In FIG. 8, the elastomer bag 414 is located behind the aluminum bottom plate of the keyboard 32 and the pointing device 34. For simplicity of illustration, the support plate 421 (FIG. 2) for the elastomer bag 414 is not shown in FIG. 8.

The outlet port of the heat dissipating member 220 is connected to the inlet port of the heat absorbing member 340 via a rubber tube 222 and a tube 322. The outlet port of the heat absorbing member 340 is connected to the inlet port of the check valve 444 via a tube 324. The outlet port of the check valve 444 is connected to the inlet port of the elastomer bag 414 via a tube 344. The outlet port of the elastomer bag 414 is connected to the inlet port of the check valve 464 via a tube 364. The outlet port of the check valve 464 is connected to the inlet port of the heat dissipating member 221 via a tube 330 and a rubber tube 224. The closed loop fluid circuit is thus formed.

In operation, when the user operates the keyboard 32 and the pointing device 34, the elastomer bag 414, in response to the pressing and vibration associated with the operation, compresses and expands in a repetitive manner and thus pumps the liquid coolant contained therein. With the elastomer bag 414 repetitively compressing, the liquid coolant contained therein is pumped through the check valve 464 and gradually flows into the heat dissipating member 221 where the heat is dissipated. After that, the liquid coolant flows into the accumulator tank 210. With the elastomer bag 414 repetitively expanding, the liquid coolant in the tank 210 flows out and is cooled through the heat dissipating member 220, and then flows into the heat absorbing member 340 where the liquid coolant absorbs heat from the heat generating portion 300. After that, the liquid coolant is passed through the check valve 444 and gradually flows back into the elastomer bag 414. In this way, the liquid coolant circulates between the heat absorbing member 340 and the heat dissipating members 220 and 221.

Figure 9:
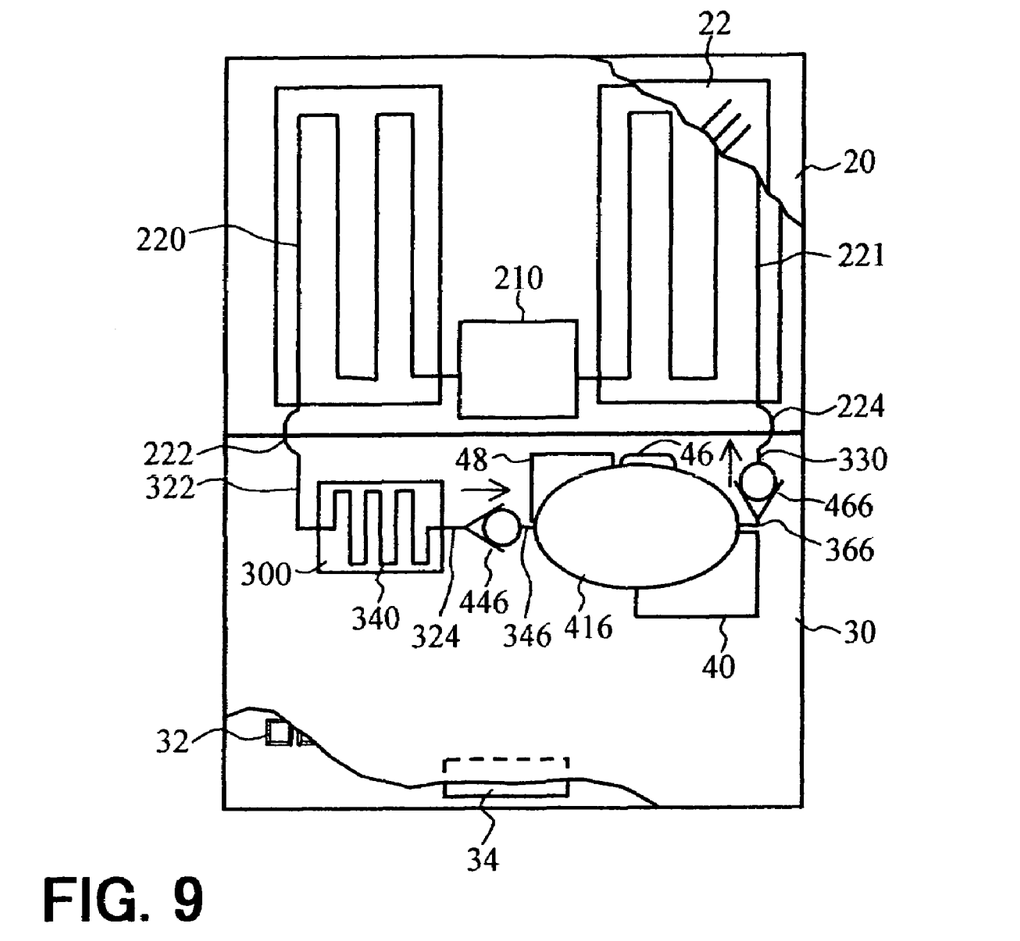
FIG. 9 shows a partially cutaway top plan view illustrating the display housing and the main unit housing of FIG. 1, in accordance with a further embodiment of the invention.

FIG. 9 shows a partially cutaway top plan view illustrating the display housing 20 and the main unit housing 30, in accordance with a further embodiment of the invention, when the display housing 20 is opened so that the display surface of the display housing 20 makes an angle of 180 degrees with the manual operation surface of the main unit housing 30 in the electronic apparatus 10 of FIG. 1. The display housing 20 has a construction similar to that shown in FIG. 2, and hence will not be described again.

In FIG. 9, the main unit housing 30 contains therein: a heat absorbing member 340 placed in close proximity to the heat generating portion 300; check valves 446 and 466 which allow the liquid coolant to flow in only one direction; and an elastomer bag 416 connected between the check valves 446 and 466. The heat absorbing member 340, check valves 446 and 466, and elastomer bag 416 are located behind the manual operation surface on the side of the keyboard 32. In FIG. 9, the elastomer bag 416 is located behind the speaker 38 and the jog dial 42. In addition, the elastomer bag 416 is located above the cooling fan 46 and the CD/DVD drive 40. Further, the elastomer bag 416 may be placed above the hard disk drive 48.

Each of the cooling fan 46, the CD/DVD drive 40, and the hard disk drive 48 generates vibration due to the eccentricity of its axis of rotation, during its operation. The speaker 38 vibrates when producing sound. The elastomer bag 416 has the effect of absorbing the vibration of the cooling fan 46, CD/DVD drive 40, and hard disk drive 48 and thus reducing the noise while also reducing the vibration to be transmitted to other components contained in the electronic apparatus 10. The elastomer bag 416 can also absorb the heat generated by the cooling fan 46, CD/DVD drive 40, and hard disk drive 48.

The outlet port of the heat dissipating member 220 is connected to the inlet port of the heat absorbing member 340 via a rubber tube 222 and a tube 322. The outlet port of the heat absorbing member 340 is connected to the inlet port of the check valve 446 via a tube 324. The outlet port of the check valve 446 is connected to the inlet port of the elastomer bag 416 via a tube 346. The outlet port of the elastomer bag 416 is connected to the inlet port of the check valve 466 via a tube 366. The outlet port of the check valve 466 is connected to the inlet port of the heat dissipating member 221 via a tube 330 and a rubber tube 224. The closed loop fluid circuit is thus formed.

In operation, when the speaker 38 produces sound, or when the user operates the jog dial 42, or when the CD/DVD drive 40, the cooling fan 46 or the hard disk drive 48 is in operation, the elastomer bag 416, in response to the pressing and vibration associated with the operation or vibration, compresses and expands in a repetitive manner and thus pumps the liquid coolant contained therein. With the elastomer bag 416 repetitively compressing, the liquid coolant contained therein is pumped through the check valve 466 and flows into the heat dissipating member 221 where the heat is dissipated. After that, the liquid coolant flows into the accumulator tank 210. With the elastomer bag 416 repetitively expanding, the liquid coolant in the tank 210 flows out and is cooled through the heat dissipating member 220, and then flows into the heat absorbing member 340 where the liquid coolant absorbs heat from the heat generating portion 300. After that, the liquid coolant is passed through the check valve 446 and flows back into the elastomer bag 416. In this way, the liquid coolant circulates between the heat absorbing member 340 and the heat dissipating members 220 and 221.

Figure 10:
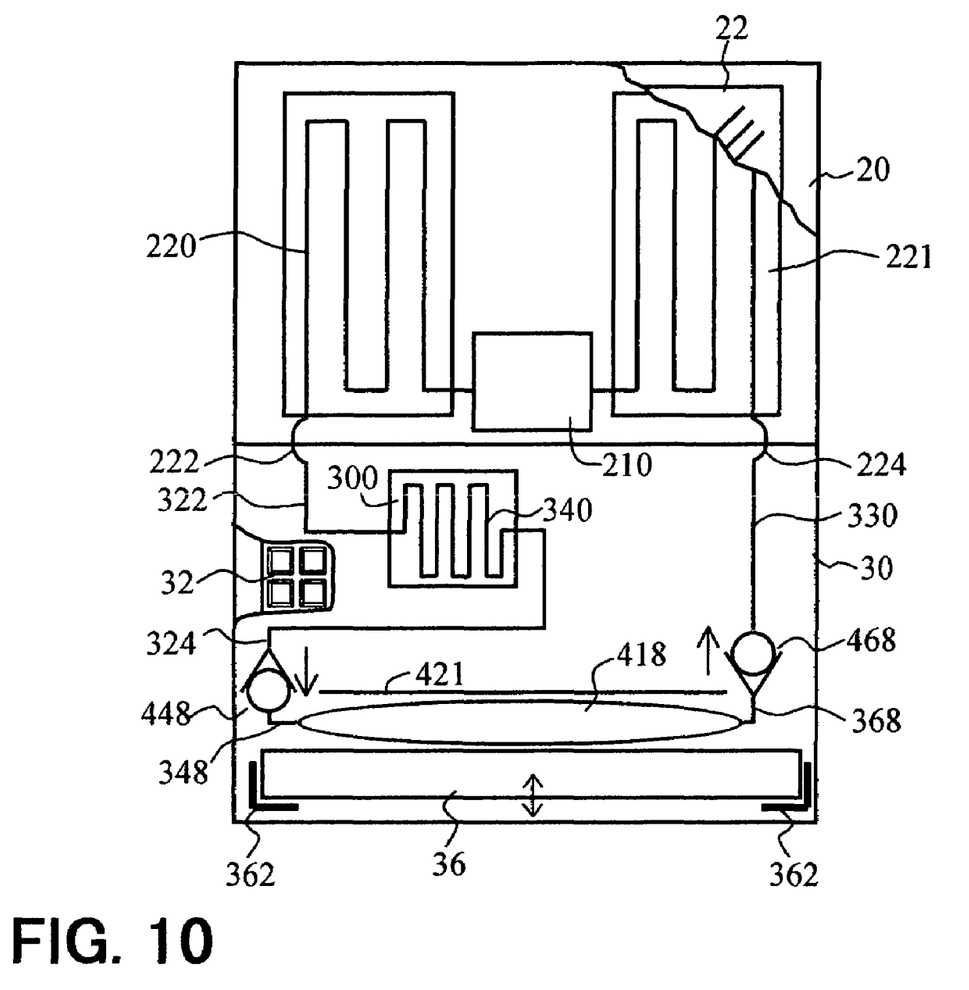
FIG. 10 shows a partially cutaway top plan view illustrating the display housing and the main unit housing in the electronic apparatus of FIG. 1, in accordance with a still further embodiment of the invention.

FIG. 10 shows a partially cutaway top plan view illustrating the display housing 20 and the main unit housing 30, in accordance with a still further embodiment of the invention, when the display housing 20 is opened so that the display surface of the display housing 20 makes an angle of 180 degrees with the manual operation surface of the main unit housing 30 in the electronic apparatus 10 of FIG. 1. The display housing 20 has a construction similar to that shown in FIG. 2, and hence will not be described again.

In FIG. 10, the main unit housing 30 contains therein: a heat absorbing member 340 which is placed in close proximity to the heat generating portion 300; check valves 448 and 468 which allow the liquid coolant to flow in only one direction; and an elastomer bag 418 which is connected between the check valves 448 and 468. The heat absorbing member 340, the check valves 448 and 468, and the elastomer bag 418 are located behind the manual operation surface of the keyboard 32. In FIG. 10, the battery 36 is a relatively heavy component, and is placed close to and along the elastomer bag 418 disposed as shown in FIG. 3B. More specifically, the battery 36 is supported, for example, on sponge-like cushioning members 362 and accommodated in the main unit housing 30 in such a manner as to be movable relative to the elastomer bag 418.

The outlet port of the heat dissipating member 220 is connected to the inlet port of the heat absorbing member 340 via a rubber tube 222 and a tube 322. The outlet port of the heat absorbing member 340 is connected to the inlet port of the check valve 448 via a tube 324. The outlet port of the check valve 448 is connected to the inlet port of the elastomer bag 418 via a tube 348. The outlet port of the elastomer bag 418 is connected to the inlet port of the check valve 468 via a tube 368. The outlet port of the check valve 468 is connected to the inlet port of the heat dissipating member 221 via a tube 330 and a rubber tube 224. The closed loop fluid circuit is thus formed.

In operation, when the electronic apparatus 10 is carried by a user, for example, in a moving train, the electronic apparatus 10 is subjected to the vibration of the train, and the battery 36 vibrates in the main unit housing 30 within the elastic limit of the cushioning members 362. When the battery 36 vibrates, the elastomer bag 418, in response to the vibration, compresses and expands in a repetitive manner and thus pumps the liquid coolant contained therein. With the elastomer bag 418 repetitively compressing, the liquid coolant contained therein is pumped through the check valve 468 and gradually flows into the heat dissipating member 221 where the heat is dissipated. After that, the liquid coolant flows into the accumulator tank 210. With the elastomer bag 418 repetitively expanding, the liquid coolant in the accumulator tank 210 flows out and is cooled through the heat dissipating member 220, and then flows into the heat absorbing member 340 where the liquid coolant absorbs heat from the heat generating portion 300. After that, the liquid coolant is passed through the check valve 448 and gradually flows back into the elastomer bag 418. In this way, the liquid coolant circulates between the heat absorbing member 340 and the heat dissipating members 220 and 221 while the electronic apparatus 10 is being operated in the moving train.

Figure 11:
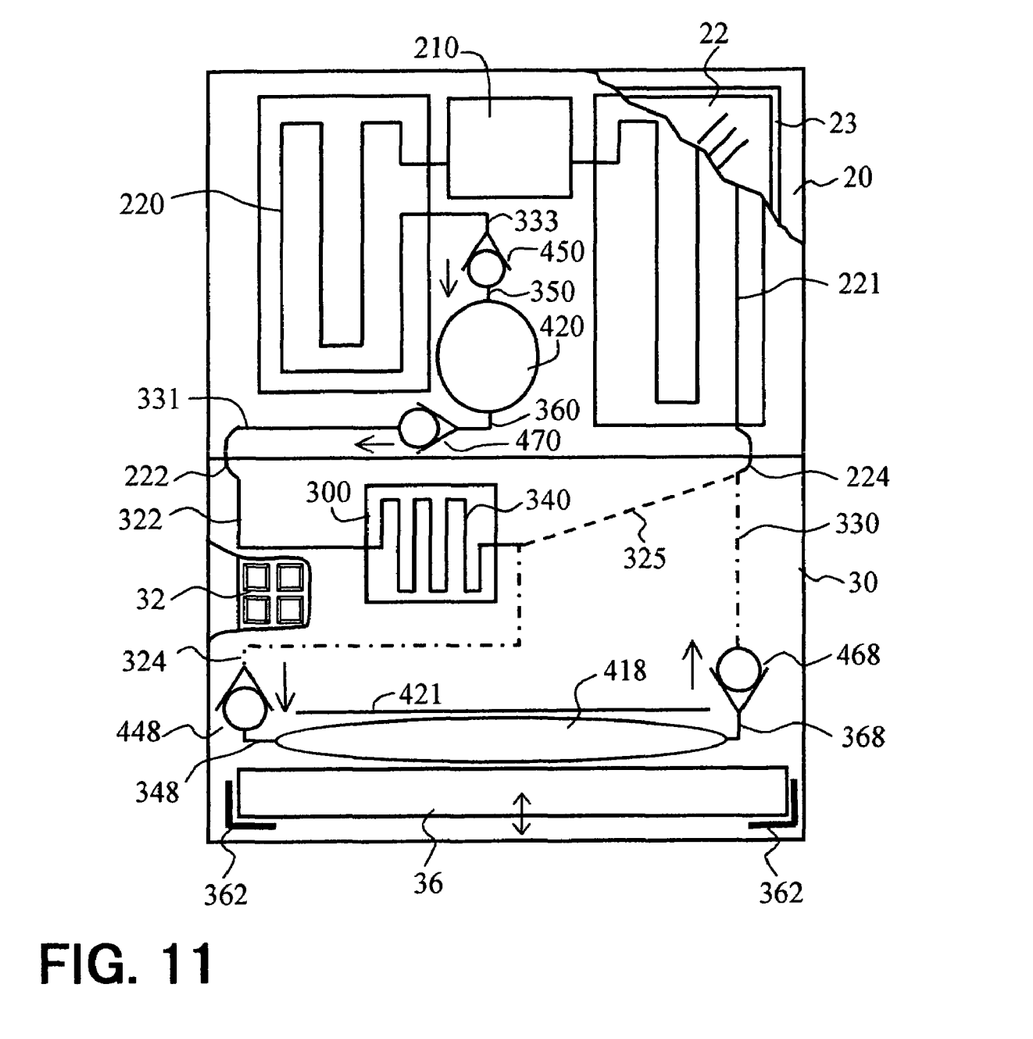
FIG. 11 shows a partially cutaway top plan view illustrating the display housing and the main unit housing in the electronic apparatus of FIG. 1, in accordance with a still further embodiment of the invention.

FIG. 11 shows a partially cutaway top plan view illustrating the display housing 20 and the main unit housing 30, in accordance with a still further embodiment of the invention, when the display housing 20 is opened so that the display surface of the display housing 20 makes an angle of 180 degrees with the manual operation surface of the main unit housing 30 in the electronic apparatus 10 of FIG. 1.

In FIG. 11, the display housing 20 contains therein: heat dissipating members 220 and 221, through which the liquid coolant flows; an accumulator tank 210 which is connected between the dissipating members 220 and 221 and used to store the cooling liquid; an elastomer bag 420; and check valves 450 and 470. The elastomer bag is disposed in close proximity to the rear side of the display 22. The heat dissipating members 220 and 221, accumulator tank 210, and check valves 450 and 470 are placed behind the display 22. The display 22 is a relatively heavy component, and is supported in the display housing 20 via a sponge-like cushioning member 23 in such a manner as to be movable in a direction perpendicular to the display surface, that is, toward and away from the elastomer bag 420, when subjected to vibration. For simplicity of illustration, the support plate 421 (FIG. 2) for the elastomer bag 414 is not shown in FIG. 11.

The main unit housing 30 contains therein a heat absorbing member 340 which is located behind the surface of the keyboard 32 and placed in close proximity to the heat generating portion 300.

The outlet port of the heat dissipating member 220 is connected to the inlet port of the check valve 450 via a tube 333. The outlet port of the check valve 450 is connected to the inlet port of the elastomer bag 420 via a tube 350. The outlet port of the elastomer bag 420 is connected to the inlet port of the check valve 470 via a tube 360. The outlet port of the check valve 470 is connected to the inlet port of the heat absorbing member 340 via a tube 331 and a rubber tube 222. The outlet port of the heat absorbing member 340 is connected to the inlet port of the heat dissipating member 221 via a tube 325 indicated by a dashed line and via a rubber tube 224. The outlet port of the heat dissipating member 221 is connected to the inlet port of the accumulator tank 210. The outlet port of the accumulator tank 210 is connected to the inlet port of the heat dissipating member 220. The closed loop fluid circuit is thus formed. In this way, the liquid coolant circulates between the heat absorbing member 340 and the heat dissipating members 220 and 221 without consuming energy or power in the electronic apparatus 10.

In operation, when the electronic apparatus 10 is operated, for example, in a moving train, the electronic apparatus 10 is subjected to the vibration of the train, and the display 22 vibrates in the display housing 20 within the elastic limit of the cushioning member 23. When the display 22 vibrates, the elastomer bag 420, in response to the vibration, compresses and expands in a repetitive manner and thus pumps the liquid coolant contained therein. With the elastomer bag 420 repetitively compressing, the liquid coolant contained therein is pumped through the check valve 470 and flows into the heat absorbing member 340 where the liquid coolant absorbs heat from the heat generating portion 300. The liquid coolant then flows into the heat dissipating member 221 where the heat is dissipated. After that, the liquid coolant gradually flows into the accumulator tank 210. With the elastomer bag 420 repetitively expanding, the liquid coolant in the tank 210 flows out and is cooled through the heat dissipating member 220, is then passed through the check valve 450, and gradually flows back into the elastomer bag 420. In this way, the liquid coolant circulates between the heat absorbing member 340 and the heat dissipating members 220 and 221.

Alternatively, similarly to the configuration shown in FIG. 10, the outlet port of the heat absorbing member 340 may be connected to the inlet port of the check valve 448 via the tube 324 indicated by a semi-dashed line; the outlet port of the check valve 448 may be connected to the inlet port of the elastomer bag 418 via the tube 348; the outlet port of the elastomer bag 418 may be connected to the inlet port of the check valve 468 via the tube 368; and the outlet port of the check valve 468 may be connected to the rubber tube 224 via the tube 330.

In this case, the arrangement consisting of the check valve 450, elastomer bag 420 and check valve 470 is connected in series with the arrangement consisting of the check valve 448, elastomer bag 418 and check valve 468, and the liquid coolant circulates between the heat absorbing member 340 and the heat dissipating members 220 and 221. If the elastomer bags 418 and 420 are each provided with a moderate restoring force, the elastomer bags 418 and 420 can alternately be caused to expand and compress, and therefore, the air bag 212 in the accumulator tank 210 may be eliminated or reduced in size.

Figure 12:
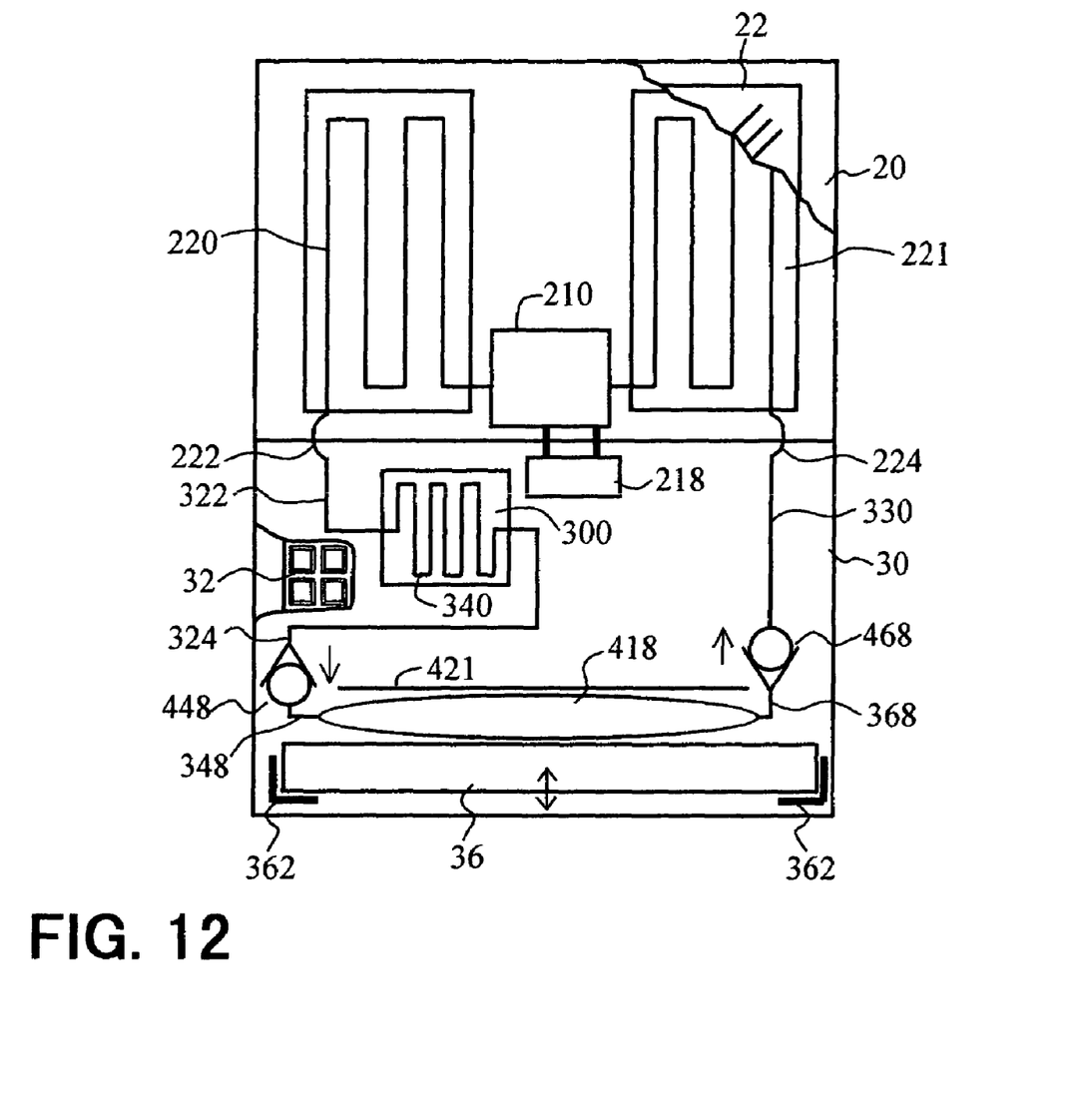
FIG. 12 shows a partially cutaway top plan view illustrating the display housing and the main unit housing in the electronic apparatus of FIG. 1, in accordance with a still further embodiment of the invention.

FIG. 12 shows a partially cutaway top plan view illustrating the display housing 20 and the main unit housing 30, in accordance with a still further embodiment of the invention, when the display housing 20 is opened so that the display surface of the display housing 20 makes an angle of 180 degrees with the manual operation surface of the main unit housing 30 in the electronic apparatus 10 of FIG. 1. The display housing 20 and the main unit housing 30 have constructions similar to those shown in FIG. 10, except that a liquid fuel such as methanol is used as the liquid coolant, that the main unit housing 30 further includes a fuel cell 218, and that the accumulator tank 210 stores the liquid fuel for the fuel cell 218. In this case, there is no need to provide a liquid coolant storage tank separately from the liquid fuel storage tank. The fuel cell 218 consumes the liquid fuel in the accumulator tank 210 as the electronic apparatus 10 is operated, and the liquid fuel in the accumulator tank 210 gradually decreases. It is desirable to replenish the liquid fuel before it is depleted. In other respects, the operation of each component in FIG. 12 is the same as that of the corresponding component in FIG. 10.

Figure 13:
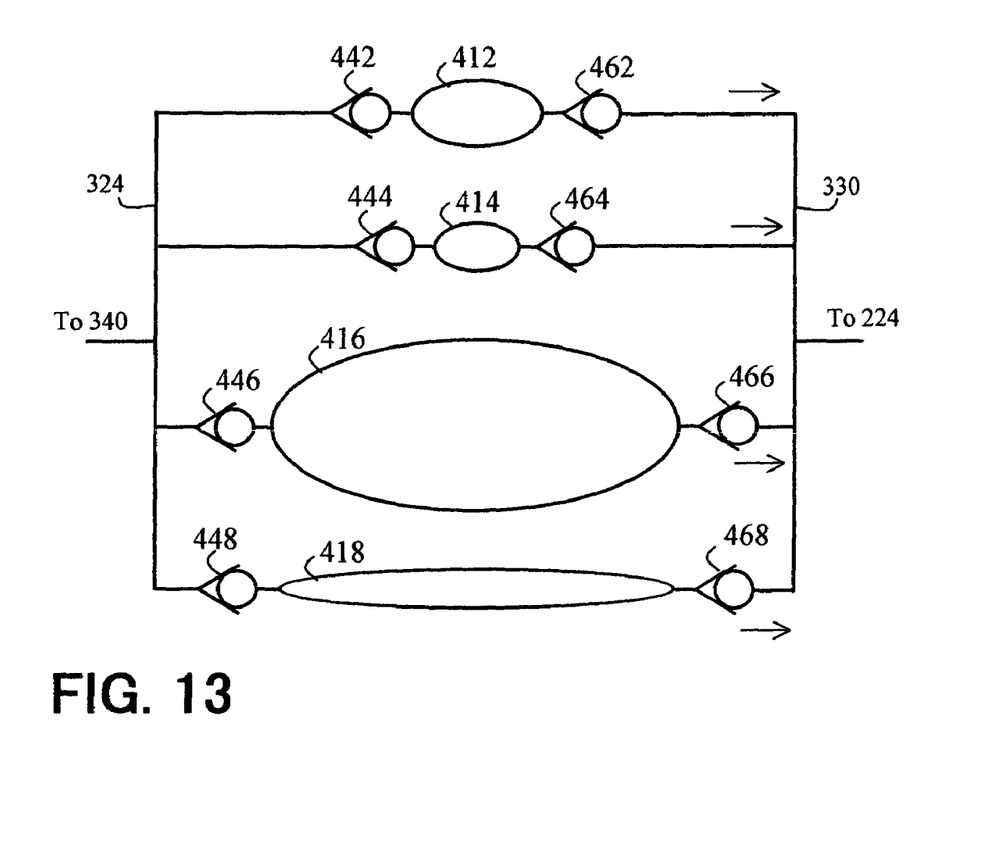
FIG. 13 shows a parallel combination of a pump element consisting of the series connection of the check valves and elastomer bag of FIG. 2, a pump element consisting of the series connection of the check valves and elastomer bag of FIG. 8, a pump element consisting of the series connection of the check valves and elastomer bag of FIG. 9, and a pump element consisting of the series connection of the check valves and elastomer bag of FIG. 10.

FIG. 13 shows a combination of a pump element consisting of the series connection of the check valve 442, elastomer bag 412 and check valve 462 shown in FIG. 2, a pump element consisting of the series connection of the check valve 444, elastomer bag 414 and check valve 464 shown in FIG. 8, a pump element consisting of the series connection of the check valve 446, elastomer bag 416 and check valve 466 shown in FIG. 9, and a pump element consisting of the series connection of the check valve 448, elastomer bag 418 and check valve 468 shown in FIG. 10. The respective pump elements are connected in parallel through branch tubes 324 and 330. Such a combination serves to further promote the circulation of the liquid coolant between the heat absorbing member 340 and the heat dissipating members 220 and 221.

In each of the embodiments shown in FIGS. 2 and 8 to 13, alternatively, the check valves may be arranged so as to flow the liquid coolant in the direction opposite to the illustrated direction. In this case, the liquid coolant is caused to flow in the opposite direction.

The above-described embodiments are only typical examples, and their modifications and variations are apparent to those skilled in the art. It should be noted that those skilled in the art can make various modifications to the above-described embodiments without departing from the principle of the invention and the accompanying claims.

What is claimed is:

1. An electronic apparatus comprising:
   a heat absorbing member;
   a heat dissipating member;
   an elastomer bag;
   a component that transmits a force to said elastomer bag, the force being a pressure applied to the component from external to the electronic apparatus or a vibration generated by the component;
   a first check valve connected to a port of said elastomer bag;
   a second check valve connected to another port of said elastomer bag; and
   a coolant which flows passing through said heat absorbing member, said first check valve, said elastomer bag, said second check valve, and said heat dissipating member,
   wherein the elastomer bag is disposed in the electronic apparatus in a position where the elastomer bag receives the force from the component thereby causing the coolant to flow.

2. An electronic apparatus according to claim 1, wherein said elastomer bag is placed in close proximity to said component, and said elastomer bag in combination with said first and second check valves operates in such a manner as to pump said coolant, in response to the application and releasing of the pressure from said component or to the vibration therefrom.

3. An electronic apparatus according to claim 1, wherein said heat absorbing member is provided in a first housing, and said heat dissipating member is provided in a second housing.

4. An electronic apparatus according to claim 1, wherein said heat absorbing member is placed in close proximity to a heat generating portion.

5. An electronic apparatus according to claim 1, further comprising an accumulator tank for storing said coolant, said tank being connected to said heat dissipating member.

6. An electronic apparatus according to claim 5, wherein said accumulator tank contains therein a closed air bag.

7. An electronic apparatus according to claim 5, wherein said accumulator tank stores said coolant flowing therein through an inlet port, and provides said coolant tightly through an outlet port.

8. An electronic apparatus according to claim 5, wherein said accumulator tank is connected to a fuel cell.

9. An electronic apparatus according to claim 1, wherein a flow path including said heat absorbing member, said first and second check valves, and said elastomer bag forms a closed loop.

10. An electronic apparatus according to claim 1, further comprising a second elastomer bag which is connected to third and fourth check valves, and which receives a pressure or vibration from a second component.

11. An electronic apparatus according to claim 10, wherein said first elastomer bag is connected in series with said second elastomer bag.

12. An electronic apparatus according to claim 10, wherein said first elastomer bag is connected in parallel with said second elastomer bag.

13. An electronic apparatus according to claim 1, said component is a hard disk drive.

14. An electronic apparatus according to claim 1, said component is a CD and/or DVD drive.

15. An electronic apparatus according to claim 1, said component is a speaker.

16. An electronic apparatus according to claim 1, said component is a fan.

17. An electronic apparatus according to claim 1, said component is a keyboard.

18. An electronic apparatus according to claim 1, said component is a jog dial.

19. An electronic apparatus according to claim 1, said component is a pointing device.

20. An electronic apparatus according to claim 1, said component is a palm rest.

21. An electronic apparatus according to claim 1, said component is a battery.

22. An electronic apparatus according to claim 1, said component is a liquid crystal device.

23. An electronic apparatus according to claim 1, said coolant is an antifreeze liquid.

24. An electronic apparatus according to claim 1, said coolant is a liquid fuel for a fuel cell.

* * * * *